United States Patent [19]

Takeuchi

[11] Patent Number: 5,285,294
[45] Date of Patent: Feb. 8, 1994

[54] IMAGE INPUT APPARATUS AND METHOD HAVING READING DENSITY CONTROL MEANS

[75] Inventor: Yukitoshi Takeuchi, Yokohama, Japan

[73] Assignee: Canon Kabushiki Kaisha, Tokyo, Japan

[21] Appl. No.: 686,482

[22] Filed: Apr. 17, 1991

[30] Foreign Application Priority Data

Apr. 20, 1990 [JP] Japan .................. 2-105623

[51] Int. Cl.⁵ ........................... H04N 1/04
[52] U.S. Cl. ..................... 358/474; 358/458
[58] Field of Search ........... 358/474, 451, 445, 486, 358/457–458

[56] References Cited

U.S. PATENT DOCUMENTS

| | | | |
|---|---|---|---|
| 4,574,357 | 3/1986 | Pastor et al. | 364/518 |
| 4,723,836 | 2/1988 | Kono et al. | 350/331 R |
| 4,783,835 | 11/1988 | Satoh | 382/48 |
| 4,812,881 | 3/1989 | Kumamoto et al. | 355/77 |
| 4,862,284 | 8/1989 | Murata | 358/474 |
| 5,047,871 | 9/1991 | Meyer et al. | 358/474 |
| 5,101,282 | 3/1992 | Homa | 358/474 |

FOREIGN PATENT DOCUMENTS 0067236 12/1982 European Pat. Off.
0295692 12/1988 European Pat. Off.

*Primary Examiner*—Stephen Brinich
*Attorney, Agent, or Firm*—Fitzpatrick, Cella, Harper & Scinto

[57] ABSTRACT

Image input apparatus and method having reading density control includes a driver for driving a scanner which reads an image. Discriminating circuitry is provided for discriminating (i) a type of software (e.g. OCR or image processing) used in the apparatus, or (ii) a type of character (e.g. Kanji or Gothic) input to the apparatus, or (iii) whether a reading density of the scanner is adequate for the input character size. Then, control circuitry controls the driver to drive the scanner with a reading density predetermined for the discriminated information type.

34 Claims, 9 Drawing Sheets

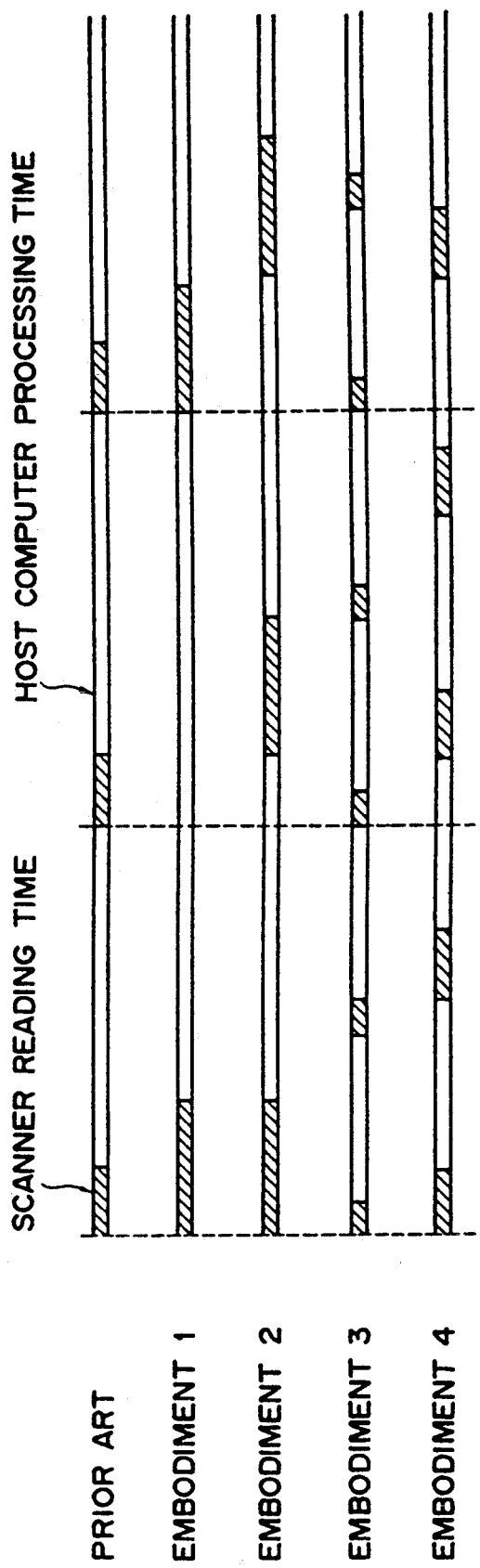

FIG. 9a
(PRIOR ART)
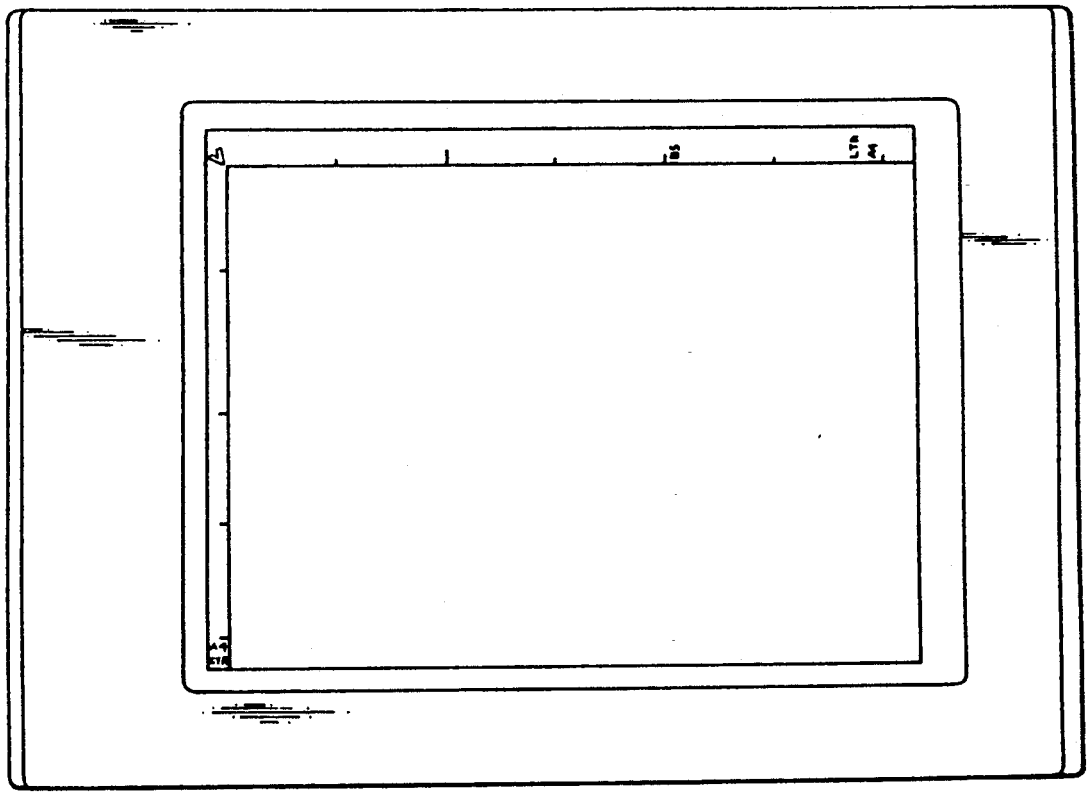
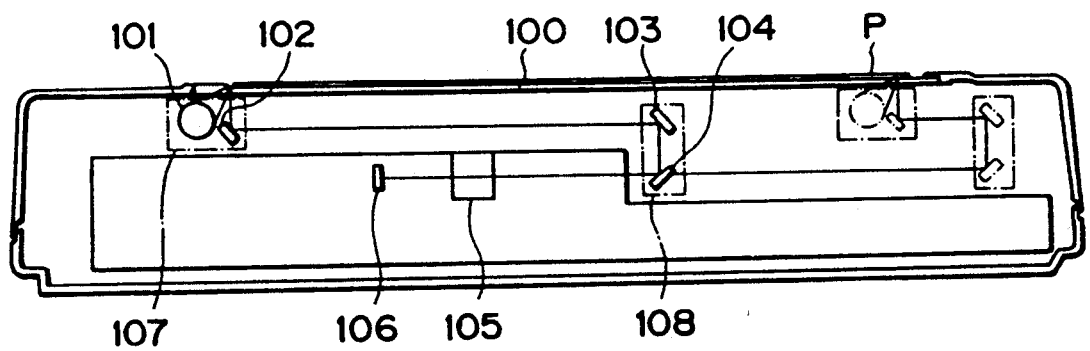
FIG. 9b
(PRIOR ART)

SUB-SCAN : STANDARD DENSITY

IMAGE INPUT APPARATUS AND METHOD HAVING READING DENSITY CONTROL MEANS

BACKGROUND OF THE INVENTION

1. Field of the Invention

The present invention relates to an image inputting apparatus which changes a reading capability in correspondence to a character to be recognized and inputs an original image.

2. Related Background Art

Generally, an image reading apparatus such as an image scanner often uses what is called a (1 : ½) optical system in which an original put on an original base glass is scanned by a light source and a mirror and is exposed onto an image sensor or a photo sensitive material.

As shown in FIG. 9, according to the (1 : ½) optical system, an original P on a fixed original base glass 100 is illuminated by a light source 101 and an image light reflected by mirrors 102, 103, and 104 is formed as an image onto an image sensor 106 or the like through an image forming lens 105. A mirror unit 108 in which the mirrors 103 and 104 are installed is scanned at a speed of ½ of a scan speed of a lamp unit 107 in which the light source 101 and the mirror 102 are installed, thereby setting an optical path length from the original surface to the image forming lens to be always constant. The mirror unit is scanned in the direction (sub-scan direction) perpendicular to the longitudinal direction of the image sensor. A scan amount of one line is set so as to be equal to a reading width in the longitudinal direction (main scan direction) of the image sensor pixel.

In many cases, the image scanner constructed as mentioned above is used as a device for a computer input.

There is an OCR function as one of the main applications of the image scanner. The most significant factor of the OCR is a recognition ratio (ratio of the number of characters which could accurately be recognized to the number of characters which have been read). The recognition ratio largely depends on a reading performance (resolution) of the image scanner.

To measure the recognition ratio, there is a case of using a chart on which alphabetic characters "e" are written on the whole surface as shown in FIG. 10. Whether the alphabetic characters "e" can accurately be recognized or not depends on whether a thin lateral line in the central portion of each character can be read or not. FIG. 11 shows an output of the image sensor in the case where the lateral line of the alphabetic character "e" has been read. It will be understood from the diagram that since the output value approaches the threshold level as the line of the character becomes thin, a possibility such that the character line after completion of the binarization is determined to be white increases. Thus, the image data of the alphabetic character "e" in which the lateral line in the central portion has been cut out is sent to the OCR and an erroneous recognition is caused.

SUMMARY OF THE INVENTION

It is an object of the invention to provide a image inputting apparatus which can solve the problems of the above conventional technique and can improve a recognition ratio.

To accomplish the above objects, the invention has reading density control means for controlling a reading density in the sub-scan direction in accordance with a thickness of lateral line to be recognized.

Further, the invention has processing speed control means for raising a character recognition processing speed in accordance with a sub-scan density.

BRIEF DESCRIPTION OF THE DRAWINGS

FIG. 6 is a diagram showing an example of out-puts of an image processor 23 and a logic operation circuit 30;

FIG. 7 is a diagram showing a comparison example of reading times of an image scanner and processing times of a host computer in the conventional example and the embodiments;

FIG. 9 is a diagram showing a structure of a conventional example;

DESCRIPTION OF THE PREFERRED EMBODIMENTS

Figure 1:
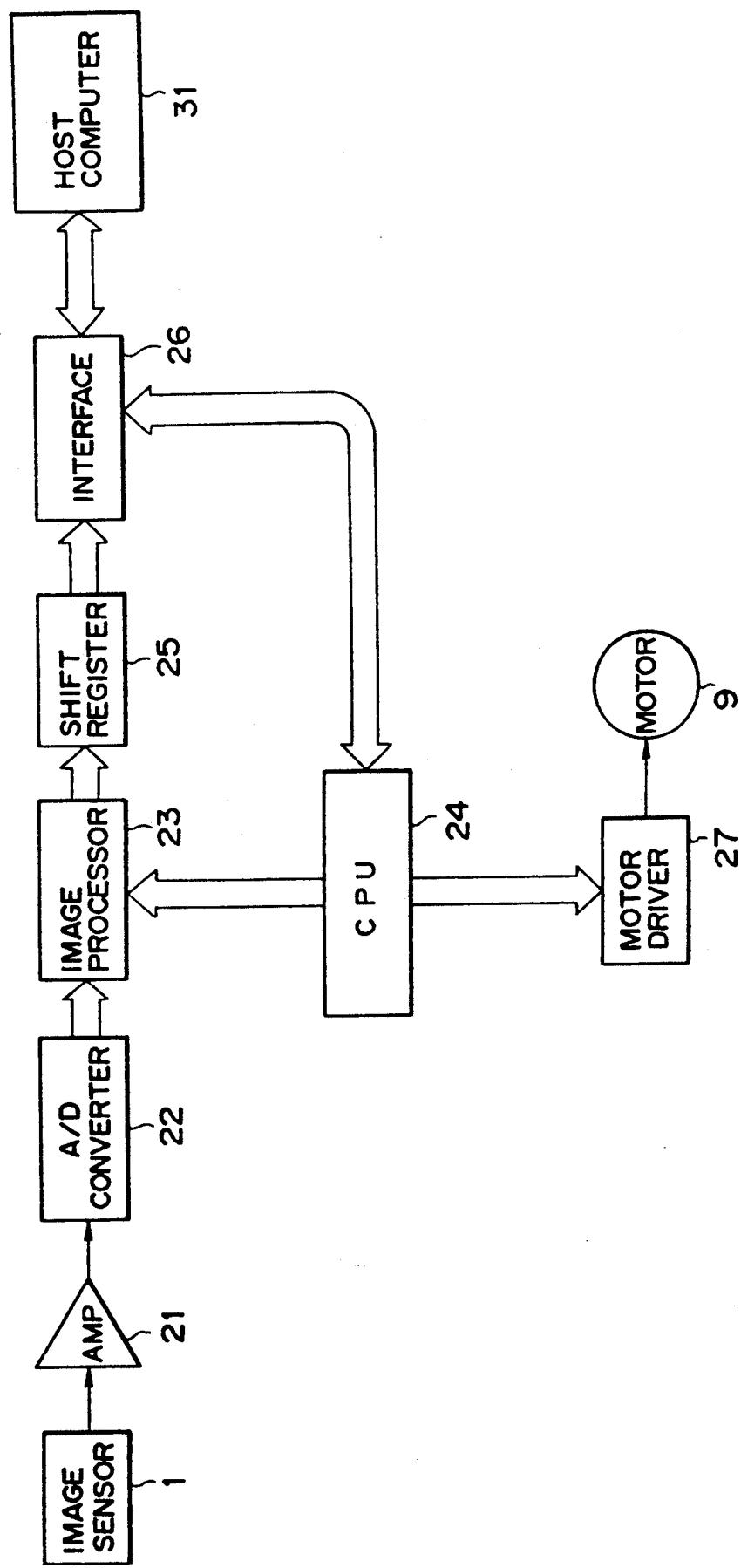
FIG. 1 is a block diagram showing a construction of an embodiment 1 of the invention.
Figure 2:
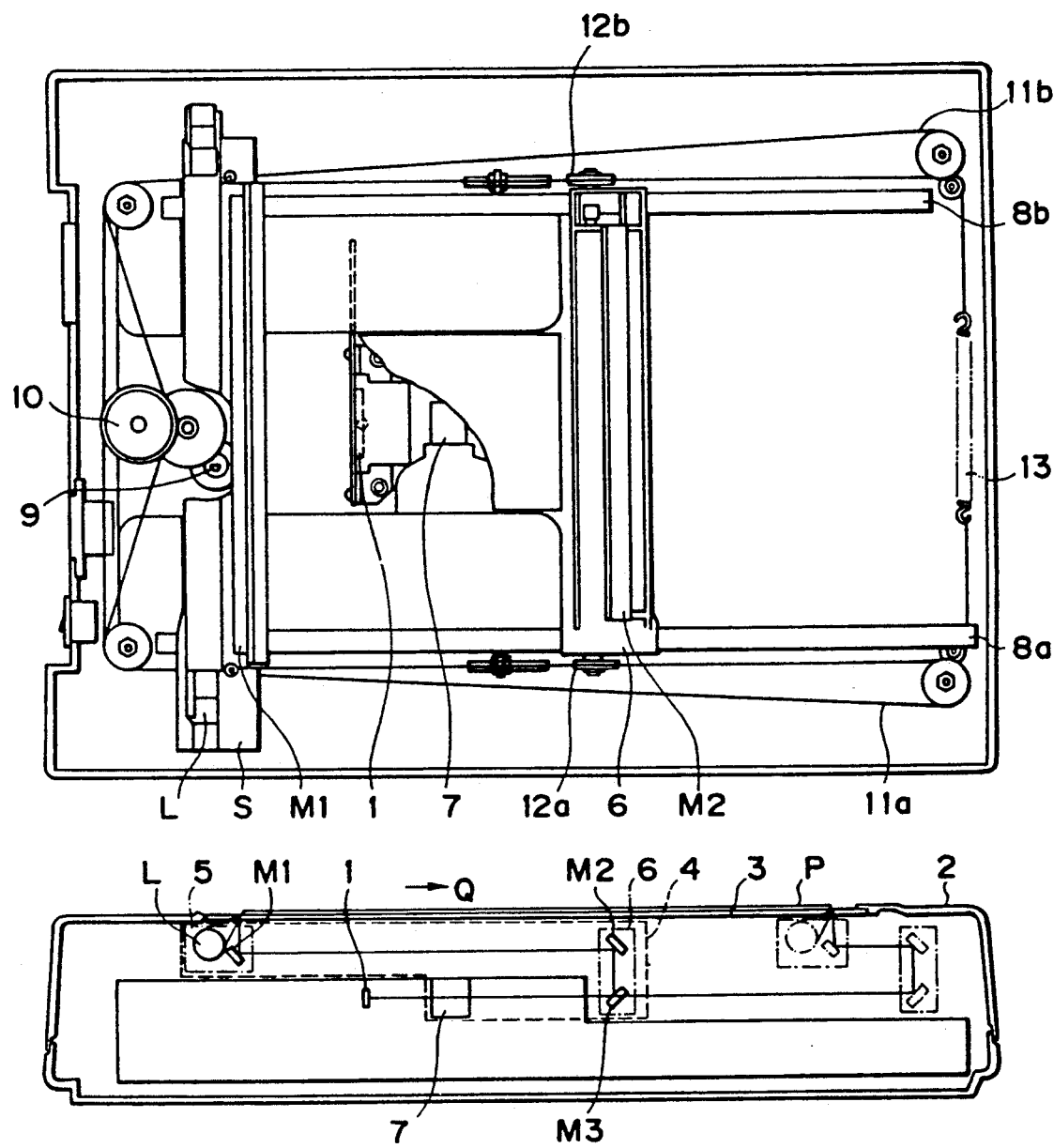
FIG. 2 is a diagram showing a structure of a first embodiment of the invention.

FIGS. 1 and 2 show first embodiment 1 of the invention.

In FIG. 2, reference numeral 1 denotes an image sensor as reading means which is arranged in an apparatus main body. An original setting glass is mounted on the upper surface of the apparatus main body. The original P put on the glass is exposed and scanned by image scanning means 4, thereby exposing an image onto the image sensor 1. The image scanning means 4 comprises: a lamp unit 5 and a mirror unit 6 which move and scan in parallel with an original setting glass 3; and a lens 7 fixed into an apparatus main body 2. The lamp unit 5 comprises: a light source L to illuminate the original P; and a first mirror $M_1$ to reflect the image reflection light of the surface of the original P which has been illuminated by the light source L to the side of the mirror unit 6. The mirror unit 6 is constructed by second and third mirrors $M_2$ and $M_3$ for turning back the image light reflected by the first mirror $M_1$ toward the image sensor 1. The lamp unit 5 moves and scans on guide rails 8a and 8b at both edges at a speed which is twice as high as a speed of the mirror unit 6 so as to keep the optical path length constant in the whole image reading region.

Reference numeral 9 denotes a pulse motor as a driving source for the scanning of the lamp unit and the mirror unit. A rotation of the pulse motor 9 is transferred to a drive pulley 10 through a gear train. Generally, in many cases, such a kind of image reading apparatus uses a pulse motor as a driving source because position control and speed control are easy. A reduction ratio of the gear train and an outer diameter of the drive pulley 10 are set in a manner such that the image scanning means 4 moves by a distance of one line when a plurality of pulses are given to the pulse motor 9. In the embodiment, it is assumed that only one line is scanned by inputting four pulses.

In the ordinary reading mode, four pulses are given to the pulse motor 9 within one accumulating time period of the image sensor 1 and image information of one line is read. By executing a thinning-out process or an interpolating process, an image can be reduced or enlarged. Upon enlargement, the number of pulses which are supplied to the pulse motor 9 within one accumulating time is reduced, thereby decreasing a sub-scan pitch. For instance, by giving two pulses within one accumulating time, the sub-scan pitch is set to 0.5 line, so that image data can be read at a double density in the sub-scan direction. Likewise, by giving one pulse, the sub-scan pitch is set to 0.25 line and image data can be read at a quadruple density in the sub-scan direction.

Two wires 11a and 11b which are coupled at one position are wrapped around the drive pulley 10. One end of each wire is fixed to the lamp unit and is wound by a half circumference around pulleys 12a and 12b at both edges of the mirror unit and is fixed to the main body. The other ends of the wires are wound by a half circumference around the pulleys 12a and 12b and are coupled to a tension spring 13. Thus, the mirror unit scans at a speed which is ½ of the speed of the lamp unit because of the principle of the running block and the optical path length is always held to a constant value in the whole scan area.

The lamp unit 5 and the mirror unit 6 are ordinarily set to the home position near the original reading start position by a home position sensor (not shown). When a reading start command is received from the host computer, motor drive pulses synchronized with a reading sync signal of the image sensor 1 are given to the pulse motor 9. The pulse motor 9 rotates, an exposure scanning system starts the scan, and the image data which has been read is transmitted to the host computer through the image processor.

In FIG. 1, reference numeral 1 denotes the same portion as that in FIG. 2. An analog image signal from the image sensor 1 is amplified by an amplifier 21 and, after that, it is converted into a digital image signal of n bits by an A/D converter 22 and is supplied to an image processor 23. The image processor 23 binarizes the digital signal or coverts a density gradation of the digital signal in accordance with a command from a CPU 24. The CPU 24 supplies a threshold value for binarization and data for shading correction to the image processor. An output from the image processor 23 is temporarily held in a shift register 25 and is sent to a host computer 31 through an interface 26 in accordance with a transfer command from the host computer 31.

The CPU 24 receives a reading start command, a reading stop command, and the like from the host computer 31 through the interface 26 and executes control of the image scanner in accordance with a predetermined procedure. Reference numeral 27 denotes a motor driver to drive the pulse motor 9 in accordance with a control signal from the CPU 24.

Figure 3:
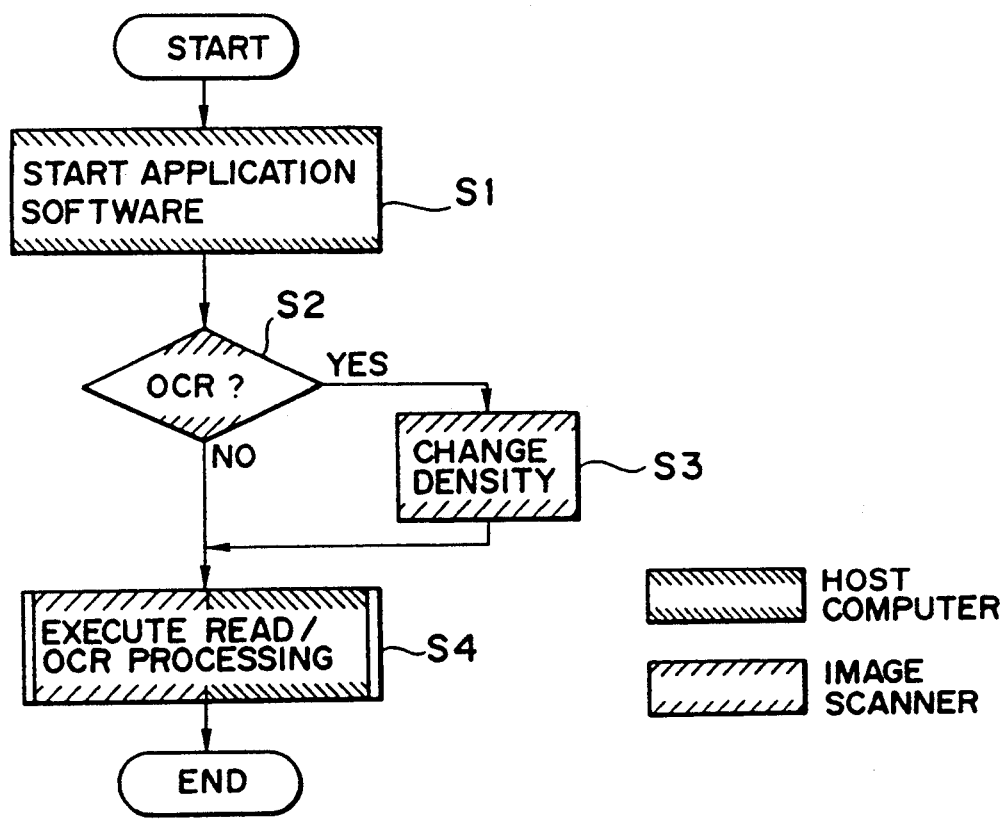
FIG. 3 is a flowchart showing an example of a control procedure by a CPU 24.

FIG. 3 is a flowchart showing an example of a control procedure by the CPU 24.

If application software has been started by the host computer 31 to which the image scanner is connected in step S1, step S2 follows. In step S2, the host computer discriminates the processing content of the software on the basis of the data written in the software. That is, the host computer checks to see if the application software is image processing software or OCR software. A result of the discrimination is sent to the CPU 24 through the interface 26.

If the CPU 24 detects that the present processing content relates to the OCR, step S3 follows and the CPU 24 switches the operating mode to a double density reading mode, that is, a mode in which two motor driving pulses are supplied to the motor within one accumulating time period thereby controlling the motor driver. In step S4, the image data which has been read is binarized on the basis of a predetermined threshold value by the image processor 23. The binary image data is sent to the host computer 31. Due to this, in the OCR mode, a clear image as shown in FIG. 4B is automatically obtained, so that the recognition ratio is improved.

Figure 4:
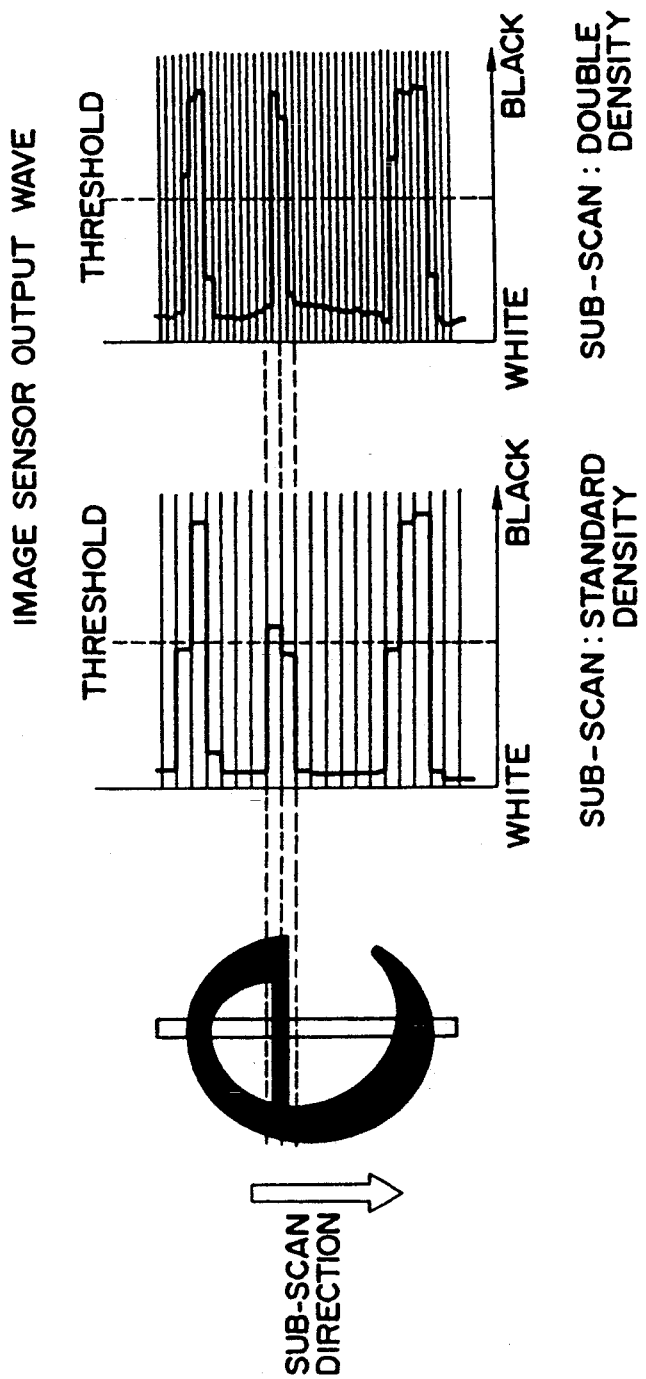
FIGS. 4A and 4B are explanatory diagrams for explaining the relation between the sub-scan density and the output of an image sensor.

Therefore, by increasing the resolution by decreasing a reading pitch of the sub-scan as shown in FIG. 4B, the lateral line is accurately discriminated. In fonts types, there are many in which the lateral line is thinner than the vertical line such as Ming-style type of Kanji (Chinese character). Therefore, by increasing the resolution in only the sub-scan direction, the recognition ratio as an OCR system is remarkably improved.

In the OCR software, since the read character is merely recognized as a character which is vertically twice as long as the character of an original, there is no need to change the conventional processings.

Although the first embodiment has been described with respect to an example in which the sub-scan density has been doubled, the sub-scan density can be set to an arbitrary value in accordance with a required recognition ratio by changing the number of motor driving pulses (it is not always necessary to set to an integer) which are given within one accumulating time period or the like.

Although the first embodiment has been described with respect to an example of the image scanner of the type in which an original is fixed, the invention is not limited to such an example and a desired object can be also accomplished in the case of the image scanner of the type in which the original base plate is moved or the type in which an original is conveyed.

The second embodiment differs from the first embodiment with respect to a point that the processing time differs.

In the first embodiment, although the recognition ratio of the OCR system is certainly improved, the time which is required for processing increases. For instance, when the sub-scan density in the OCR system is set to the double density, a data amount is also doubled, so that both of the required reading time of the image scanner and the processing time of the OCR software are doubled.

Generally, since the time which is required to process the OCR software is longer than the required reading time of the image scanner, in the second embodiment, a selector 28, a buffer memory 29, and a logic operation circuit 30 are arranged between the image processor 23 and the shift register 25 in parallel with a data bus so as to bypass the data bus. Due to this, the processing time of the software is reduced by half time and the whole processing time is remarkably reduced.

Since the second embodiment has been constructed as mentioned above, when the application software is started by the host computer 31 to which the image scanner is connected, the host computer discriminates the processing content of the software on the basis of the data written in the software. Namely, the host computer checks to see if the application software is image processing software or OCR software. A result of the discrimination is sent to the CPU 24 of the image scanner through the interface 26. When the CPU 24 detects that the present processing content relates to the OCR, the CPU 24 switches the operating mode to the double density reading mode, that is, a mode in which two motor driving pulses are given to the motor within one accumulating time period, thereby controlling the motor driver 27. The image data which has been read is binarized by the image processor 23 on the basis of a predetermined threshold value. The binary signal is supplied to the logic operation circuit 30 through the buffer memory every other line or is directly serially transmitted to the logic operation circuit 30. The data of a certain line stored in the buffer memory 29 is supplied to the logic operation circuit 30 synchronously with the data of the next line from the image processor 23. The OR condition of the data of two continuous lines is calculated by the logic operation circuit 30. That is, in the case where the data of two lines of a certain pixel indicate black and white, the black data is transferred to the shift register 25 at the post stage (refer to FIG. 6).

According to the above method, since the image data is read at a high density in the sub-scan direction, the thin lateral line is read without becoming blurred in a manner similar to the first embodiment. Moreover, since an amount of data which is transferred to the host computer is generally the same as the data amount upon reading, the time which is required for the OCR processing is equal to that in the conventional apparatus. Since a required reading time by the image scanner is much shorter than the processing time of the OCR, a required time as a whole system is merely slightly increased as compared with the conventional one (refer to FIG. 7).

Although the second embodiment has been described with respect to an example in which a buffer memory to store the image data of one line is provided on one of two data lines connecting the image processor and the logic operation circuit, buffer memories can be provided on both of the data lines as necessary or a capacity of the buffer memory can be also increased by an amount of a few lines.

An third embodiment differs from the first and second embodiments with respect to a point that a character style of a character to be read differs. That is, in the first and second embodiments, a character style having a thin lateral line such as a Ming-style type or the like has been read. However, in the third embodiment, a character of a Gothic-style type which is sufficiently larger as compared with the resolution of the image scanner, is read.

In this case, by making the sub-scan density coarse, the reading time of the image scanner and the processing time of the OCR can be reduced.

Figure 8:
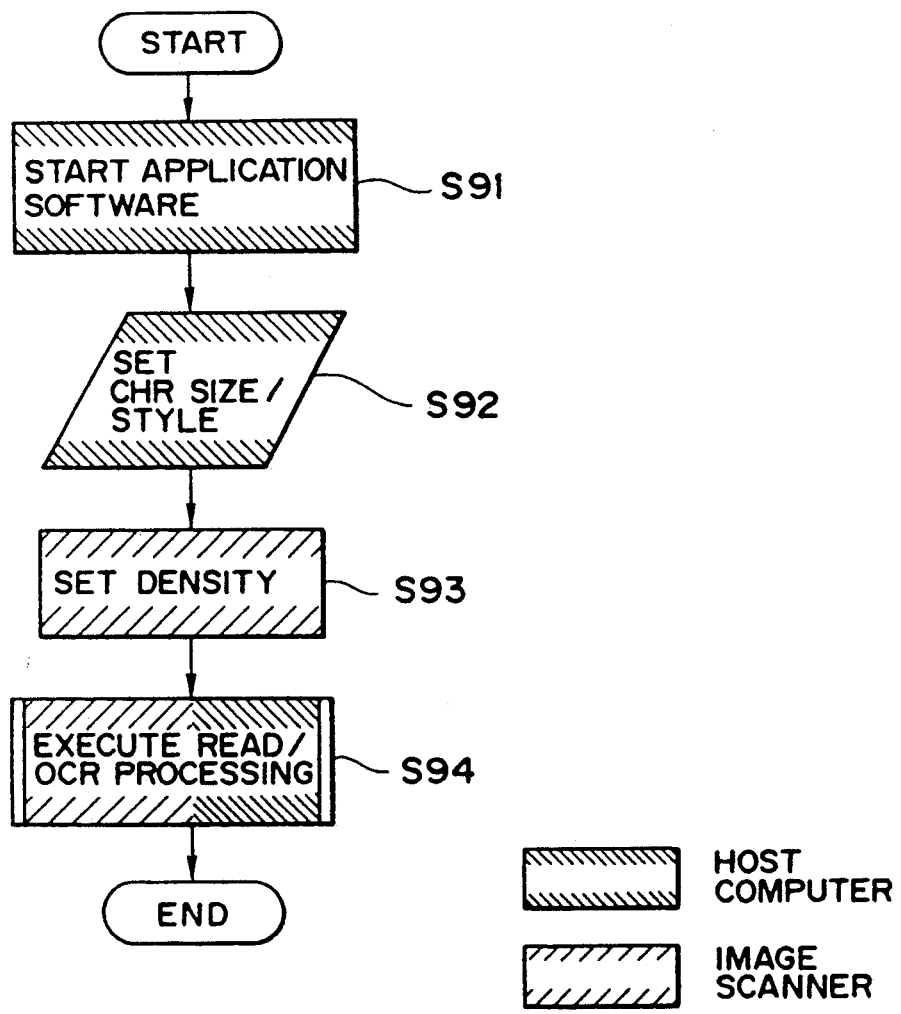
FIG. 8 is a flowchart showing an example of a control procedure by the CPU according to a third embodiment.
Figure 10:
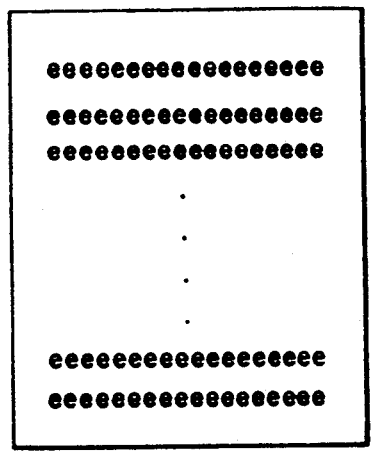
FIG. 10 is a diagram showing an example of a chart for measuring a recognition ratio.
Figure 11:
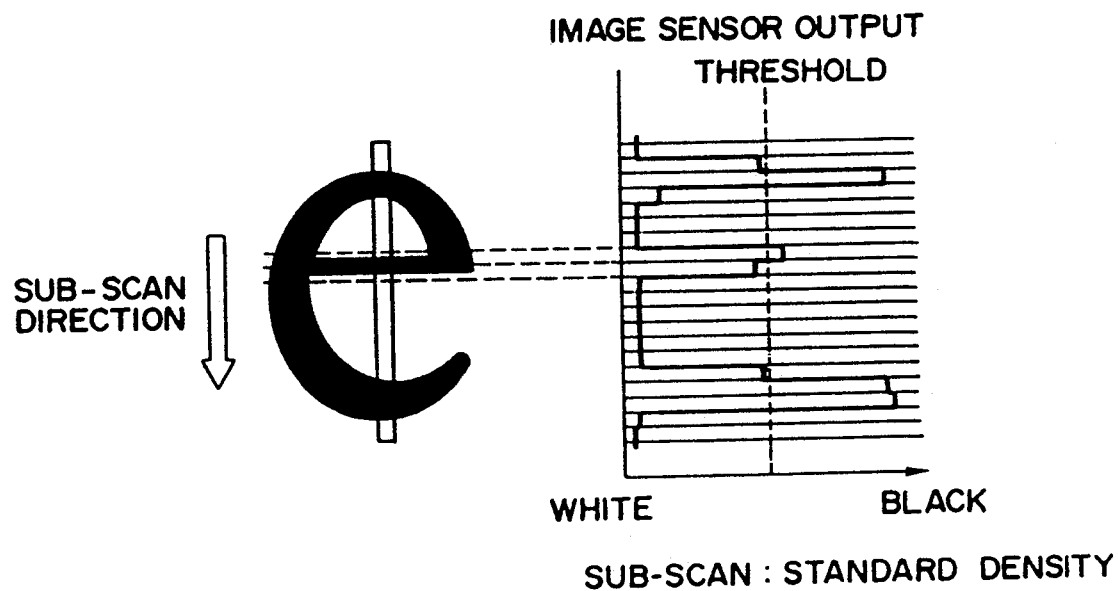
FIG. 11 is a diagram showing an example of an output of an image sensor in the case where an alphabetic character "e" has been read in the conventional example.

FIG. 8 is a flowchart showing an example of a control procedure by the CPU 24.

The OCR is activated by the host computer 31 (step S91) and parameters such as character size (point number) and type style are set (step S92). The image scanner receives that information and discriminates the necessary sub-scan density. That is, when a thickness of a lateral line of a character included in the original is thinner than the resolution of the image scanner itself, it is necessary to raise the density. Therefore, the reading operation is executed in accordance with the method described in the first and second embodiment. On the contrary, if a character in the original is thick enough, the reading operation is performed in accordance with the following procedure (steps S93, S94).

In a manner similar to the first embodiment, in the reading mode, generally, it is assumed that the sub-scan of one line is executed by supplying four pulses to the pulse motor. When a character in the original is large, the number of pulses which are sent to the motor within one accumulating time period is increased. For instance, in the case where a thickness of a lateral line in a combination of the set character size and a type style has a value such that it can be sufficiently discriminated even if such a lateral line is read at a pitch which is twice as large as that in the ordinary reading mode, in the circuit of FIG. 1, the CPU 24 controls the motor driver 27 so as to supply eight pulses to the motor within one accumulating time period. Due to this, the image scanner reads the original at a pitch which is twice as large as that in the ordinary mode and a required reading time is reduced to half of the ordinary reading time. Since the amount of image data is reduced to ½, the time which is required for the OCR processing is also decreased to ½. Thus, the total required time is reduced to ½ (refer to FIG. 7).

In the case of reading a large character, by thinning out the data in the main scan direction, an amount of data which is transferred to the host computer can be further reduced.

An increase in number of motor driving pulses which are supplied within one accumulating time period in the third embodiment results in a reduction reading operation which is executed in the sub-scan direction. However, in such an image scanner, in many cases, the data which has been read at an ordinary density is thinned out for reduction. It is necessary to raise the rotational speed of the motor. Therefore, as mentioned above, in many cases, a method whereby the number of motor driving pulses which are supplied within one accumulating time period is increased cannot be embodied.

In such a case, by processing using the circuit (refer to FIG. 6) of the second embodiment, when an original having a character which is larger than the resolution of the image scanner is read by the OCR, an amount of data which is sent to the host computer can be remarkably reduced.

In a manner similar to the third embodiment, in the case where it is determined that the original can be read at a coarse density due to parameters such as the size of character and the type style which have been supplied to the host computer, the reading operation by the image scanner is performed in the ordinary mode. However, the output data amount from the image processor is reduced to ½.

Thus, although the reading time by the image scanner is unchanged, the time which is required for the OCR processing is decreased to ½ (refer to FIG. 7).

Although the example of an OCR has been described in the embodiments, for instance, in the case of reading a table which is constructed by thin ruled lines, a phenomenon such that the ruled lines become blurred can be prevented by using the circuit of the second embodiment.

Figure 5:
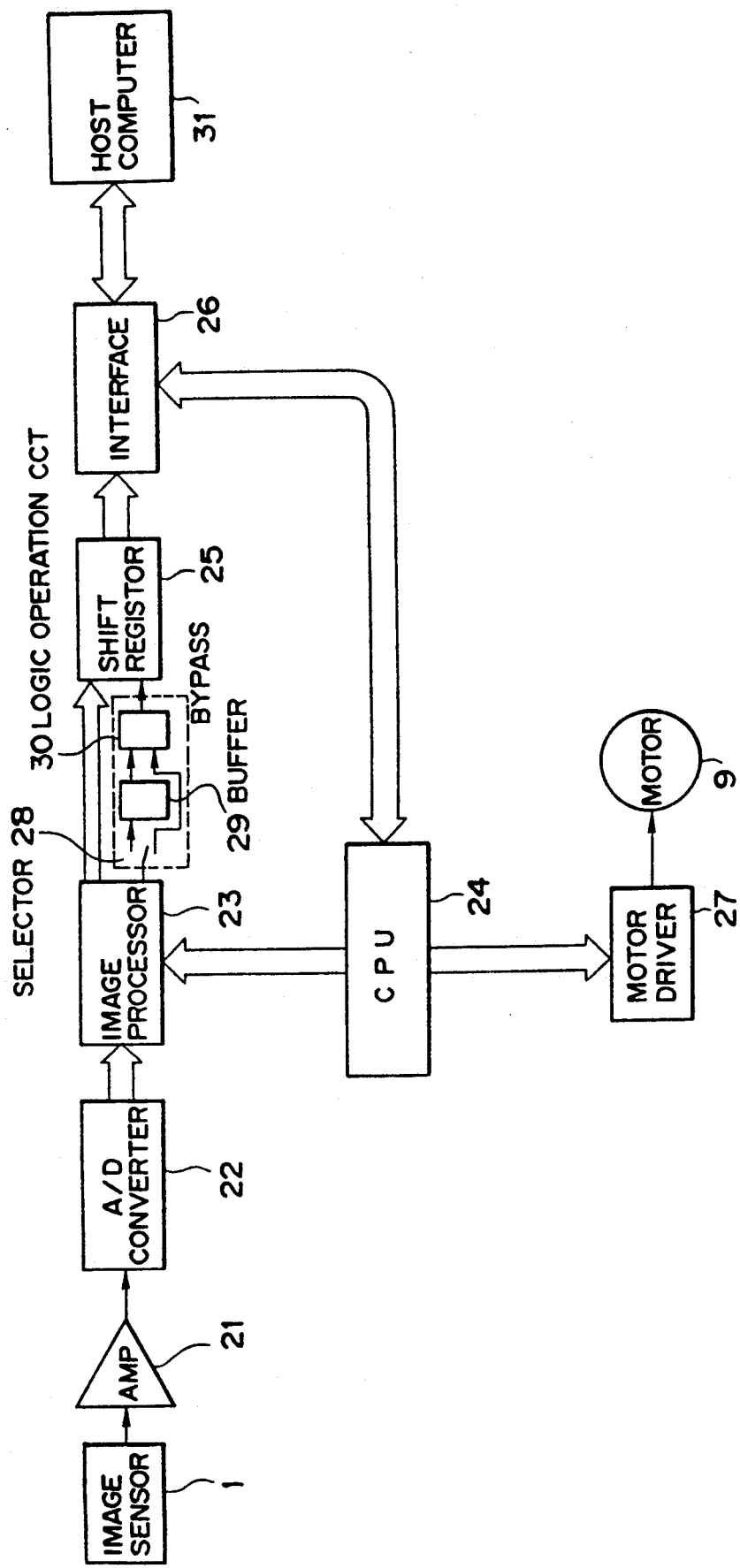
FIG. 5 is a diagram showing a construction of a second embodiment of the invention.

In the above case, such a phenomenon can be prevented by constructing an algorithm in a manner such that the image data passes through the bypass shown in FIG. 5 when a command such as "double density reading" or "standard density transfer" is sent from the host computer.

On the other hand, in types which are generally used, there are many types in which the vertical line is thinner than the lateral line. Therefore, the recognition ratio of the OCR system can be remarkably improved.

Further, since it is sufficient to merely modify a part of the application software and a part of the firmware of the image scanner, an increase in costs doesn't occur.

In the case of reading a large character, the reading time can be reduced.

What is claimed is:

1. An image apparatus comprising
   drive means for driving a scanner which reads an image;
   discriminating means for discriminating a type of software used in said apparatus;
   determining means for determining a reading density for the discriminated type of software; and
   control means for controlling said drive means to drive the scanner with the determined reading density.

2. An apparatus according to claim 1, wherein said discriminating means discriminates that the software is OCR software.

3. An apparatus according to claim 1, wherein said control means controls said drive means by changing a period in which pulses for driving said drive means is generated.

4. An apparatus according to claim 1, further comprising an image sensor for reading the image.

5. An apparatus according to claim 1, further comprising a motor driven by said drive means.

6. An apparatus according to claim 1, further comprising a host computer which initializes said software.

7. An apparatus according to claim 1, further comprising a buffer memory for storing data of the read image, and selecting means for selecting data supplied to said buffer memory in response to the determined reading density.

8. An image input apparatus comprising:
   drive means for driving a scanner which reads an image;
   discriminating means for discriminating a type of character input to said apparatus;
   determining means for determining a reading density for the discriminated type of character; and
   control means for controlling said drive means to drive the scanner with the determined reading density.

9. An apparatus according to claim 8, wherein said discriminating means discriminates a size of the character.

10. An apparatus according to claim 8, wherein said discriminating means discriminates a style of the character.

11. An apparatus according to claim 8, wherein said control means controls said drive means for changing a period in which pulses for driving said drive means are generated.

12. An apparatus according to claim 8, further comprising an image sensor for reading the image.

13. An apparatus according to claim 8, further comprising a motor driven by said drive means.

14. An image input apparatus comprising:
   drive means for driving said scanner which reads an image;
   input means for inputting a character size;
   discriminating means for discriminating whether a reading density of the scanner is adequate for the input character size; and
   changing means for changing the reading density when said discriminating means discriminates that the reading density is inadequate for the input character size.

15. An apparatus according to claim 14, further comprising control means for controlling said drive means to drive the scanner by changing a period in which pulses for driving said drive means are generated.

16. An apparatus according to claim 14, further comprising an image sensor for reading the image.

17. An apparatus according to claim 14, further comprising a motor driven by said drive means.

18. A method of inputting image information into an apparatus, comprising the steps of:
   driving, with a drive means, a scanner which reads an image;
   discriminating, with discriminating means, a type of software used in said apparatus;
   determining, with determining means, a reading density for the discriminated type of software; and
   controlling, with control means, said drive means to drive the scanner with the determined reading density.

19. A method according to claim 18, wherein said discriminating step includes the step of discriminating that the software is OCR software.

20. A method according to claim 18, wherein said controlling step includes the step of controlling said drive means by changing a period in which pulses for driving said drive means are generated.

21. A method according to claim 18, further comprising a step of reading, with an image sensor, the image.

22. A method according to claim 18, wherein said driving step includes the step of driving the scanner with a motor.

23. A method according to claim 18, further comprising the step of initializing the software using a host computer.

24. A method according to claim 18, further comprising the steps of:
   storing, with a buffer memory, data of the red image; and
   selecting, with selecting means, data supplied to said buffer memory in response to the determined reading density.

25. A method of inputting image information into an apparatus comprising the steps of:
   driving, with a drive means, a scanner which reads an image;
   discriminating, with discriminating means, a type of character input to said apparatus;
   determining, with determining means, a reading density for the discriminated type of character; and
   controlling, with control means, said drive means to drive the scanner with the determined reading density.

26. A method according to claim 25, wherein said discriminating step discriminates a size of a character.

27. A method according to claim 25, wherein said discriminating step discriminates a style of the character.

28. A method according to claim 25, wherein said controlling step includes the step of controlling said drive means by changing a period in which pulses for driving the drive means are generated.

29. A method according to claim 25, further comprising the step of reading, with an image sensor, the image.

30. A method according to claim 25, wherein said driving step includes the step of driving the scanner with a motor.

31. A method of inputting image data into an apparatus, comprising the steps of:
   driving, with a drive means, a scanner which reads an image;
   inputting, with input means, a character size;
   discriminating, with discriminating means, whether a reading density of the scanner is adequate for the input character size; and
   changing, with changing means, the reading density when said discriminating step discriminates that the reading density is inadequate for the input character size.

32. A method according to claim 31, further comprising the step of controlling, with control means, the drive means to drive the scanner by changing a period in which pulses for driving the drive means are generated.

33. A method according to claim 31, further comprising the step of reading, with an image sensor, the image.

34. A method according to claim 31, wherein said driving step includes the step of driving the scanner with a motor.

* * * * *

UNITED STATES PATENT AND TRADEMARK OFFICE
CERTIFICATE OF CORRECTION

PATENT NO. : 5,285,294

DATED : February 8, 1994

INVENTOR(S) : YUKITOSHI TAKEUCHI

Page 1 of 2

It is certified that error appears in the above-identified patent and that said Letters Patent is hereby corrected as shown below:

SHEET 5 OF 9

FIG. 5, "REGISTOR" should read --REGISTER--.

COLUMN 1

Line 63, "a" should read --an--.

COLUMN 2

Line 9, "an embodiment 1" should read --a first embodiment--.
Line 10, "FIG. 2 is a diagram" should read --FIGS. 2a and 2b are diagrams--.
Line 29, "FIG. 9 is a diagram" should read --FIGS. 9a and 9b are diagrams--.
Line 40, "first" should read --a first-- and "1" (2nd occurrence) should be deleted.

COLUMN 4

Line 13, "period" should read --period,--.
Line 22, "fonts" should read --font--.

COLUMN 5

Line 49, "An" should read --A--.

COLUMN 6

Line 4, "embodiment." should read --embodiments.--.

UNITED STATES PATENT AND TRADEMARK OFFICE
CERTIFICATE OF CORRECTION

PATENT NO. : 5,285,294
DATED : February 8, 1994
INVENTOR(S) : YUKITOSHI TAKEUCHI It is certified that error appears in the above-identified patent and that said Letters Patent is hereby corrected as shown below:

<u>COLUMN 7</u>

Line 15, "comprising" should read --comprising:--.
    Line 30, "is" should read --are--.

<u>COLUMN 8</u>

Line 47, "red" should read --read--.

Signed and Sealed this

Thirtieth Day of August, 1994

*Attest:*

BRUCE LEHMAN

*Attesting Officer*    *Commissioner of Patents and Trademarks*